United States Patent
Morris

(10) Patent No.: US 7,156,273 B2
(45) Date of Patent: Jan. 2, 2007

(54) CONVERTIBLE CARGO CONTAINER SYSTEM

(76) Inventor: Daniel W. Morris, 140 Winette Way, Taylors, SC (US) 29687

( * ) Notice: Subject to any disclaimer, the term of this patent is extended or adjusted under 35 U.S.C. 154(b) by 517 days.

(21) Appl. No.: 10/698,539

(22) Filed: Oct. 31, 2003

(65) Prior Publication Data

US 2005/0092799 A1    May 5, 2005

(51) Int. Cl.
  *B60R 9/045*    (2006.01)
(52) U.S. Cl. .................. 224/487; 224/519; 108/14; 108/44
(58) Field of Classification Search ........ 224/484–488, 224/495, 497, 511, 519, 522–524, 527, 535, 224/314, 42.32, 42.34; 296/37.1; 220/6, 220/7, 4.28, 4.33, 692, 617, 4.34; 108/11, 108/14, 44
See application file for complete search history.

(56) References Cited

U.S. PATENT DOCUMENTS

| | | | | |
|---|---|---|---|---|
| 1,002,937 | A * | 9/1911 | Spade ...................... 190/12 A |
| 2,228,203 | A * | 1/1941 | De Hoffmann ................ 5/119 |
| 2,258,364 | A * | 10/1941 | Maxwell ..................... 190/11 |
| 2,389,930 | A * | 11/1945 | Pendry ........................ 108/14 |
| 2,473,022 | A * | 6/1949 | Fenske, Jr. ................ 190/12 R |
| 4,034,518 | A * | 7/1977 | Trecker ......................... 5/114 |
| 4,231,453 | A * | 11/1980 | Minor ......................... 190/11 |
| 4,735,151 | A * | 4/1988 | Bisbing ....................... 108/69 |
| 4,906,015 | A * | 3/1990 | LaCroix et al. .......... 280/415.1 |
| 5,113,920 | A * | 5/1992 | Sedeniussen ............. 144/286.5 |
| 5,215,234 | A * | 6/1993 | Pasley ........................ 224/508 |
| 5,294,027 | A * | 3/1994 | Plastina ...................... 224/553 |
| 5,368,209 | A * | 11/1994 | Hill ............................ 224/497 |
| 5,524,383 | A * | 6/1996 | Sanko et al. ................... 47/60 |
| 5,586,702 | A * | 12/1996 | Sadler ........................ 224/521 |
| 5,588,549 | A * | 12/1996 | Furtner .......................... 220/7 |
| D388,383 | S * | 12/1997 | Foster et al. ............... D12/162 |
| 5,730,066 | A * | 3/1998 | Auten et al. ................. 108/44 |
| 5,881,937 | A | 3/1999 | Sadler ........................ 224/509 |
| 5,967,325 | A * | 10/1999 | McIntire ..................... 206/541 |
| 6,041,958 | A * | 3/2000 | Tremelo .................... 220/4.28 |
| 6,179,184 | B1 * | 1/2001 | Belinky et al. ............. 224/510 |
| 6,293,451 | B1 | 9/2001 | LeMay et al. .............. 224/509 |
| 6,375,055 | B1 * | 4/2002 | Spykerman et al. ........ 224/542 |
| 6,379,101 | B1 | 4/2002 | Breaux ....................... 414/537 |
| 6,761,119 | B1 * | 7/2004 | Davis .......................... 108/14 |
| 6,802,441 | B1 * | 10/2004 | DuRant et al. ............. 224/513 |
| 6,846,017 | B1 * | 1/2005 | Martin ....................... 280/769 |

* cited by examiner

*Primary Examiner*—Nathan J. Newhouse
*Assistant Examiner*—Justin M. Larson
(74) *Attorney, Agent, or Firm*—Charles L. Schwab; Nexsen Pruet, LLC

(57) ABSTRACT

A convertible cargo container system having individual components that provide a table or work surface. The container system includes a pair of foldable side panels and a pair of rigid end panels coupled to the ends of each side panel to form an enclosed container. A back panel is hingeably connected to a top panel to form one side panel, and a bottom panel is hingeably connected to a front panel to form the other side panel. Each of the front, back, and bottom panels has opposing coupling ends. The interior surface of each end panel has a coupling track that receives the coupling ends of the front, back, and bottom panels. Each of the side panels may be unfolded to provide a table or work surface. Additionally, each of the side panels have retracting or folding legs attached to the interior surface of the side panel that may be extended or unfolded to support the table or work surface. A vehicle hitch coupling support is attached to the bottom of the container.

10 Claims, 5 Drawing Sheets

CONVERTIBLE CARGO CONTAINER SYSTEM

FIELD OF THE INVENTION

This invention relates to cargo container systems, and more particularly to cargo container systems that are attachable to a vehicle hitch.

BACKGROUND OF THE INVENTION

Spectator sports, particularly football, usually include a common pastime known as a "tailgate" party that is an activity where spectators gather for fun and recreation. Millions of people attend spectator sports on an annual basis such that the popularity of tailgating has become a national pastime. A tailgate party, or tailgating, usually requires picnic items, including tables, chairs, beverage coolers, etc. Such items are brought to a location of the spectator sport and usually carried in a vehicle as loose items. When at the location of the spectator sport, the loose picnic items are unloaded and set-up on tables for tailgate party activities. Such picnic items are later loaded back into the vehicle for transport after the tailgate party. The packing, transporting, unpacking, and repacking process surrounding the tailgate party is a cumbersome and time-consuming process.

Cargo carriers have been developed to assist in transporting items via vehicles. Such carriers are commonly adapted to couple with a trailer hitch found on a vehicle for external transport of items using the vehicle. For example, U.S. Pat. No. 5,881,937 describes a movable frame assembly for storing and transporting items that includes a connection member for mating with a common trailer hitch and a frame member slidably attached to the connection member. The assembly is attached to the trailer hitch on a vehicle and is slidably movable, permitting outward extension away from the vehicle while still being connected to the vehicle. A storage container may be connected to the frame member.

U.S. Pat. No. 6,293,451 describes a hitch carrier that is removably mounted at a rear of a vehicle. The hitch carrier includes a frame assembly having a forward section configured for insertion in a hitch sleeve and a cargo unit attached to the frame assembly such that the cargo unit may be telescoped towards and away from the rear of the vehicle. The cargo unit has a hingeably mounted aerodynamic lid and includes handholds and a locking mechanism for locking the lid in a closed position.

U.S. Pat. No. 6,379,101 describes a ramp and cargo system that is removably attachable to a trailer hitch socket of a vehicle for loading and unloading a wheeled vehicle into the vehicle. The ramp and cargo system includes a ramp base, a first ramp member hingeably mounted to the ramp base, a second ramp member hingeably mounted to the ramp base, and a third ramp member hingeably mounted to the second ramp member such that the second ramp member and third ramp member may be folded onto one another.

The aforementioned cargo carrier systems provide general cargo carriers that are connectable to conventional trailer hitches mounted on vehicles and specifically permit access to the rear of the vehicles. A cargo container system is desirable that both assists in the organization of cargo items while simplifying the amount of items required to be packed and transported. Such a cargo container system is particular suitable for tailgate party applications or other recreational activities by minimizing the number of items required to be packed and transported to a desired location. More particularly, it is desirable to have a cargo container that may be simply assembled and disassembled to function as a transportable container while assembled and provide a table when at least partially disassembled.

SUMMARY OF THE INVENTION

An object of this invention is to provide a cargo container system that is a container when assembled while providing a table or work surface when at least partially disassembled.

Another object of this invention is to provide a cargo container system having a container for storing items therein that may be simply assembled and disassembled.

A more particular object of this invention is to provide a cargo container system having a convertible container that may be disassembled into at least one table and reassembled to store and transport cargo.

Another object of this invention is to provide a cargo container system that is attachable to and detachable from a conventional vehicle trailer hitch.

Another object of this invention is to provide a cargo container system that may be locked to secure the contents of the container.

These and other objects of the invention are accomplished by providing a convertible cargo container system having at least one component that individually provides a table or work surface. The container system includes a convertible container having a pair of foldable side panels and a pair of rigid end panels coupled to the ends of each side panel to form an enclosed container. A back panel is hingeably connected to a top panel to form one side panel, and a bottom panel is hingeably connected to a front panel to form the other side panel. Each of the front, back, and bottom panels has opposing coupling ends. The interior surface of each end panel has a coupling track that receives the coupling ends of the front, back, and bottom panels. The top panel is secured to the front panel by a conventional lock or latch. When the convertible container is disassembled, at least one of the side panels may be unfolded to provide a table or work surface. Additionally, at least one of the side panels has at least one leg support that may be extended or retracted in length such as by folding or telescoping. Each leg support is attached to the interior surface of the side panel and extends to support the table or work surface.

When assembling the container, the side panels are secured to the end panels. An example of a device for securing a side panel to an end panel is a use of conventional quick-release pins that are inserted through aligned holes formed in the panels. For example, a hole may be formed through both the track of one end panel and a coupling end of one side panel. After the coupling end of the side panel is inserted into the track and the respective holes of the end panel and side panel are aligned, the side panel is secured to the end panel by inserting a quick-release pin through the aligned holes.

In one embodiment, the container is secured to a carrier having a hitch portion connected to a platform. The hitch portion couples with conventional hitches found on automobiles and trucks. The platform is preferably sized to receive a bottom panel of the container and includes locking clasps to secure the container to the platform. In another embodiment, a trailer hitch coupler is affixed to the bottom panel of the container so that the container may be directly attached to conventional hitches found on automobiles and trucks.

The convertible cargo container system is ideally suited for many types of recreational activities including, but not limited to, carpentering, plumbing, crafting, flea marketing, hunting, fishing, tailgating, and other sporting activities by providing a container, for organizing and transporting items, that may be converted into at least one table or work surface for use during the recreational activity.

DETAILED DESCRIPTION OF THE INVENTION

The present invention is a convertible cargo container system having at least one component that individually provides a table or work surface. The convertible cargo container system provides a lockable container when assembled and provides at least one table or work surface when at least partially disassembled. The present invention is particularly suited for tailgating applications and other recreational activities by providing a cargo container for storing items including but not limited to food, drinks, eating utensils, condiments, and decorations, that may be wholly or partially disassembled into at least one free standing table or work surface.

Figure 1:
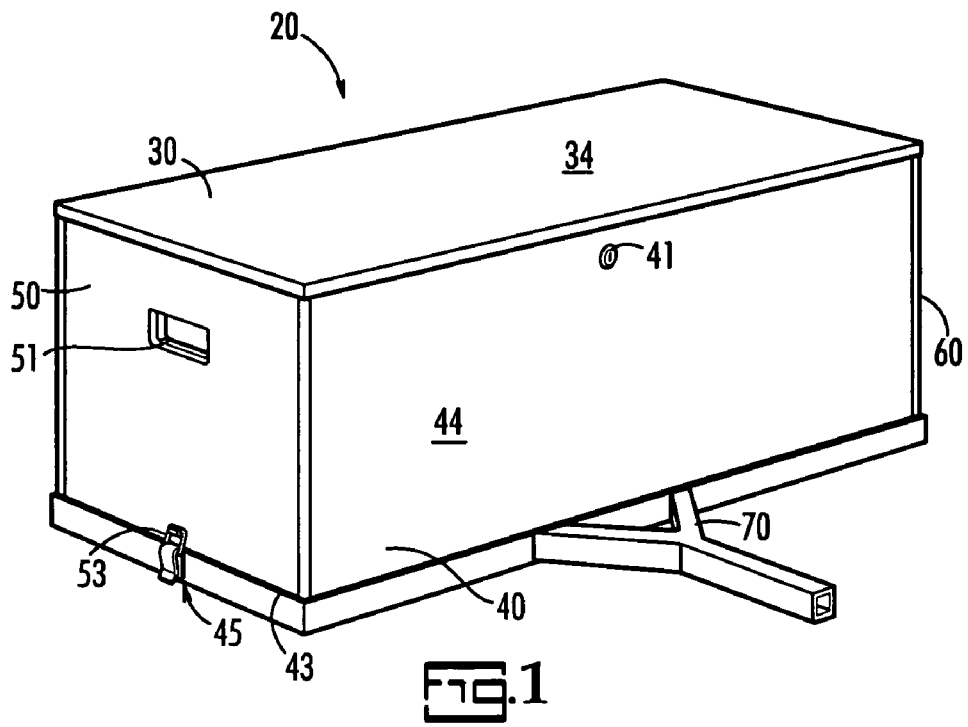
FIG. 1 is a front perspective view of a convertible cargo container in accordance with the present invention.
Figure 2:
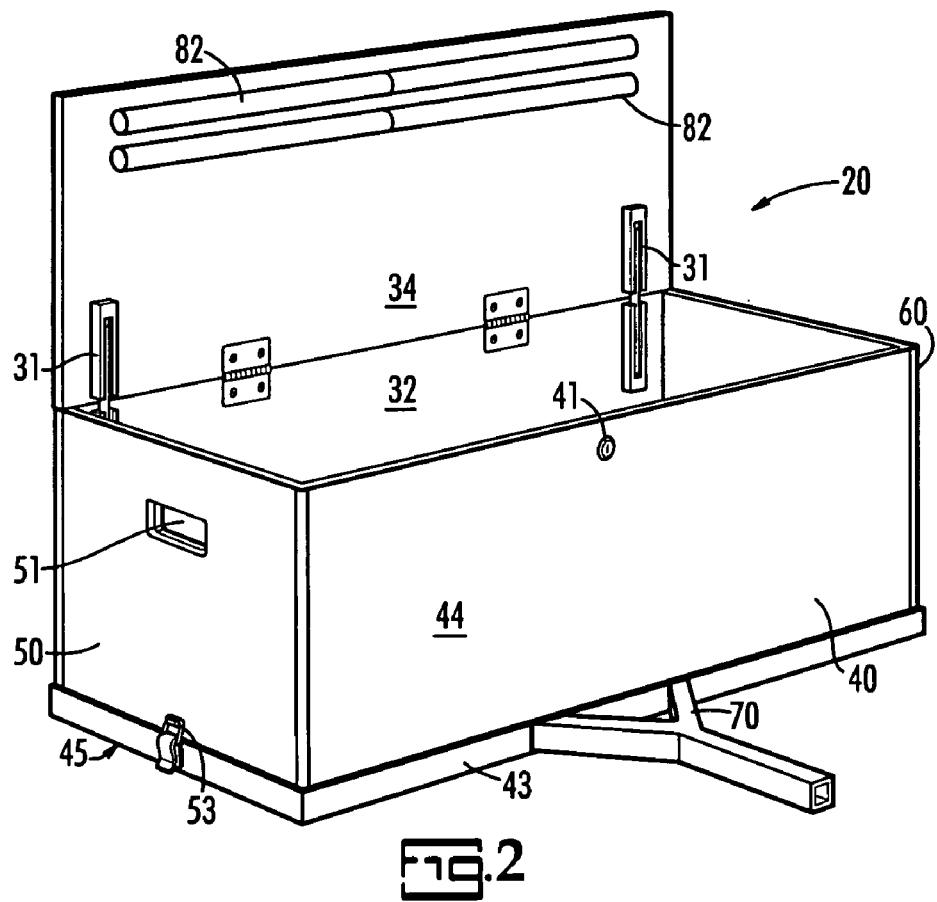
FIG. 2 is a perspective view of the convertible cargo container shown in FIG. 1 in an open configuration.
Figure 3:
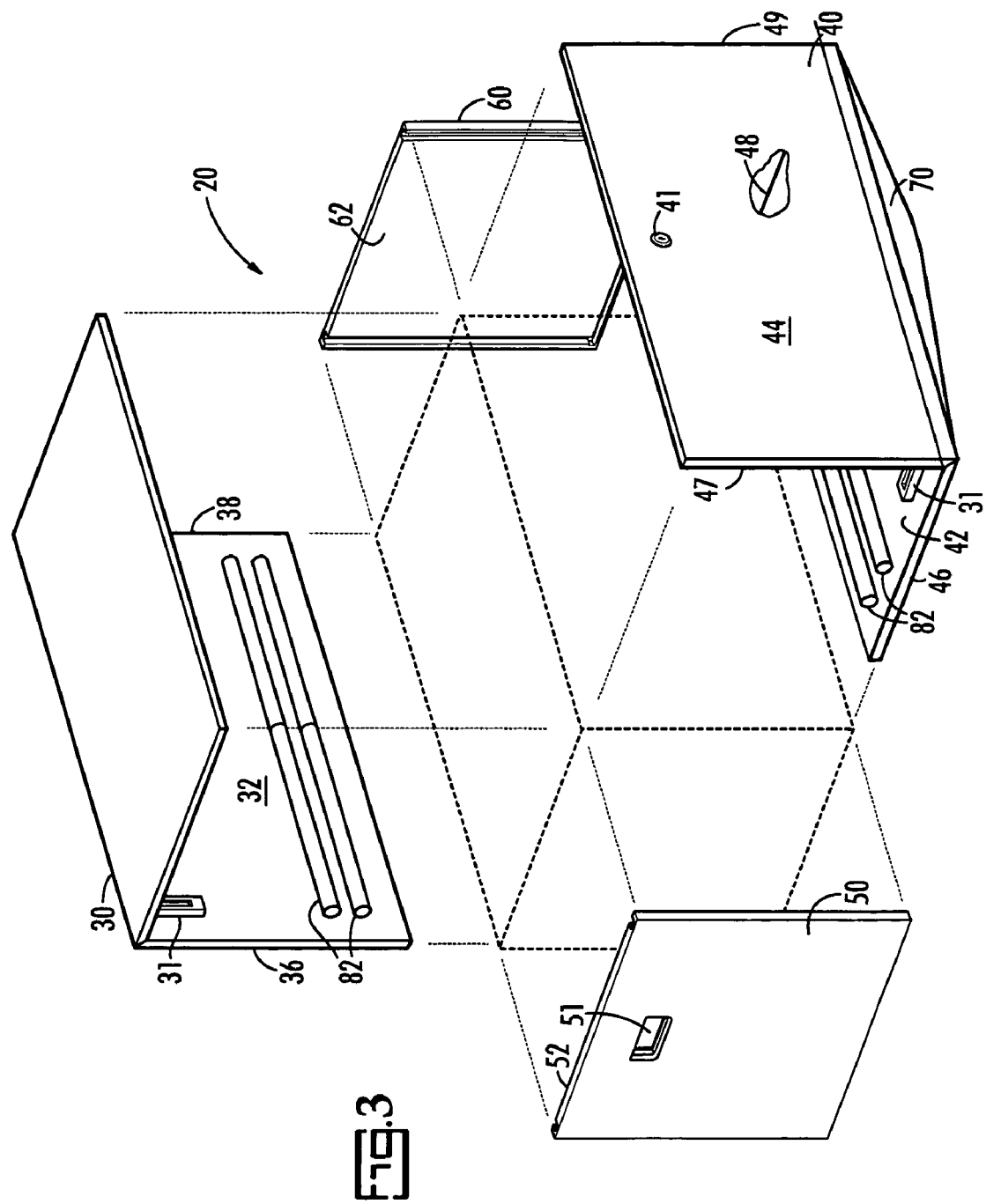
FIG. 3 is an exploded view of the convertible cargo container shown in FIG. 1.

Referring now to the drawings, FIG. 1 is a front perspective view of a convertible cargo container, shown generally at 20, in accordance with the present invention. FIG. 2 is a perspective view of the convertible cargo container 20 shown in FIG. 1 in an open configuration. FIG. 3 is an exploded view of the convertible cargo container 20 shown in FIG. 1. The cargo container 20 includes a pair of foldable side panels 30, 40 and a pair of rigid end panels 50, 60 that are coupled and secured to the ends of each side panel 30, 40 to form an enclosed container. Each of the side panels 30, 40 includes two portions that fold or pivot with respect to each other. In a preferred embodiment, hinges are used to connect one portion of the side panel with the other portion of the side panel. One side panel 30 may be folded and then secured to the other side panel 40 by a lock or latch 41 thereby permitting closing and securing of the assembled container 20. When the lock is unlocked or the latch released, a portion of one side panel 30 may pivot open such that the container 20 is in an open configuration to permit access to the container 20, as best shown in FIG. 2, and allow disassembly of the container 20.

In one embodiment, the container 20 is secured to a carrier, shown generally at 45 (FIGS. 1 and 2), having a platform 43 and the hitch adapter 70 attached thereto. As best shown in FIGS. 1 and 2, the platform 43 is preferably sized to receive a bottom panel 42 (FIGS. 3 and 4) of the container 20 and includes locking clasps 53 to secure the container 20 to the platform 43. In another embodiment, the hitch adapter 70 is attached to one of the side panels 40 of the container 20, preferably the bottom panel 42 (FIGS. 3 and 4) of the assembled container. The hitch adapter 70 allows for easy connection and disconnection of the container 20 to a conventional hitch assembly found on a vehicle.

A back panel 32 (FIGS. 2 and 3) is hingeably connected to a top panel 34 to form one side panel 30, and the bottom panel 42 (FIGS. 3 and 4) is hingeably connected to a front panel 44 to form the other side panel 40. Assembly of the invented cargo container 20 includes folding or pivoting one portion of each side panel 30, 40 with respect to the other portion such that the portions are positioned substantially perpendicular to one another. For assembly with the end panels 50, 60, the back panel 32 is pivoted to a position substantially perpendicular to the top panel 34, and the bottom panel 42 is pivoted to a position substantially perpendicular to the front panel 44.

Each of the back panel 32, the bottom panel 42, and the front panel 44 have a pair of opposing coupling ends 36, 38, 46, 48, 47, 49, respectively, for connection with an end panel 50, 60. Each end panel 50, 60 has a coupling track 54, 64 positioned on an interior surface 52, 62 that receives one of the coupling ends 36, 38 of the back panel 32, one of the coupling ends 47, 49 of the front panel 44, and one of the coupling ends 46, 48 of the bottom panel 42. Each coupling track 54, 64 has a corresponding segment for receiving one of the coupling ends 36, 38 of the back panel 32, one of the coupling ends 47, 49 of the front panel 44, and one of the coupling ends 46, 48 of the bottom panel 42. For example, the coupling track 54 of one end panel 50 includes a back segment that receives one coupling end 36 of the back panel 32, a front segment 95 that receives one coupling end 47 of the front panel 44, and a bottom segment that receives one coupling end 46 of the bottom panel 42. In this example, the coupling track 64 of the other end panel 60 includes a back segment that receives the other coupling end 38 of the back panel 32, a front segment that receives the other coupling end 49 of the front panel 44, and a bottom segment that receives the other coupling end 48 of the bottom panel 42.

As previously mentioned, locking clasps are preferably used and detailed herein with respect to securing the container 20 to the carrier 45. This securing mechanism is not critical to the present invention, and alternative conventional mechanisms may be used to secure the container 20 to the carrier 45 including, by way of example and not of limitation, a padlock in combination with eyelets attached to both the container 20 and the platform 43 for receiving a shackle of the padlock or a padlock in combination with a latch.

Figure 4:
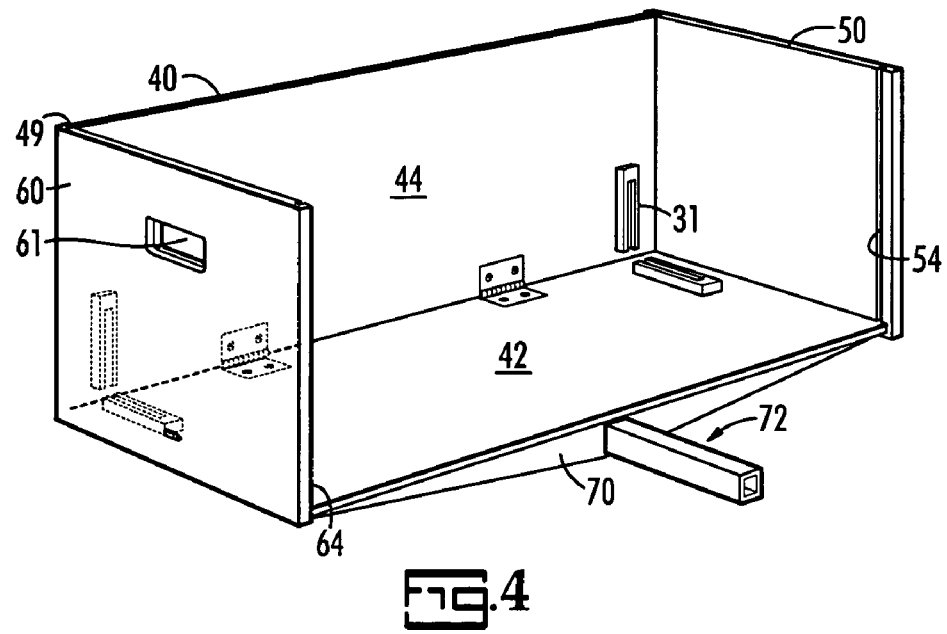
FIG. 4 is a rear perspective view of a partially assembled convertible cargo container with a side panel removed in accordance with the present invention.

FIG. 4 is a rear perspective view of a partially assembled convertible cargo container 20 with a side panel 30 removed in accordance with the present invention. As best shown in FIG. 4, one side panel 40 engages with the end panels 50, 60 such that one coupling end 46 of the bottom panel 42 is received in the coupling track 54 of one end panel 50, the other coupling end 48 of the bottom panel 42 is received in the coupling track 64 of the other end panel 60, one coupling end 47 of the front panel 44 is received in the coupling track 54 of one end panel 50, and the other coupling end 49 of the front panel 44 is received by the coupling track 64 of the other end panel 60. Also shown in FIG. 4, the coupling track 54 of one end panel 50 has a portion for receiving one coupling end 36 of the back panel 32, and the coupling track 64 of the other end panel 60 has a portion for receiving the other coupling end 38 of the back panel 32.

At least one of the coupling ends 36, 38, 46, 48, 47, 49 of the side panels 30, 40 is secured to an end panel 50, 60. Examples of devices for securing a side panel to an end panel are a conventional quick-release pin or a shackled padlock that is inserted through an aligned hole formed in the panels. For example, a hole may be formed through both the coupling track of one end panel and a coupling end of one side panel. After the coupling end of the side panel is inserted into the coupling track and the respective holes of the end panel and side panel are aligned, the side panel is secured to the end panel by inserting a quick-release pin through the aligned holes. Although a track and quick-release pin combination is preferably used and detailed herein, this securing mechanism is not critical to the present invention. Alternative conventional mechanisms may be used to secure a side panel to an end panel including, by way of example and not of limitation, a hook and slot combination where hooks a formed on the coupling end of the side panels that are received by slots formed on the end panels.

As shown in FIGS. 3 and 4, the hitch adapter 70 is attached to the bottom panel 42 and includes a mating member 72 for connecting to a conventional vehicle hitch assembly. Although the hitch adapter 70 is described with respect to conventional vehicle hitch assemblies, other vehicle mounted attachment mechanisms may be used that allow the container to be transported externally of a vehicle while being secured to the same. Additionally, hitch assemblies are not critical to the operation of the container 20 and other attachment devices may be used in place of a hitch assembly for connection to the mating member 72 including but not limited to bumper mounted supports or rails.

Figure 5:
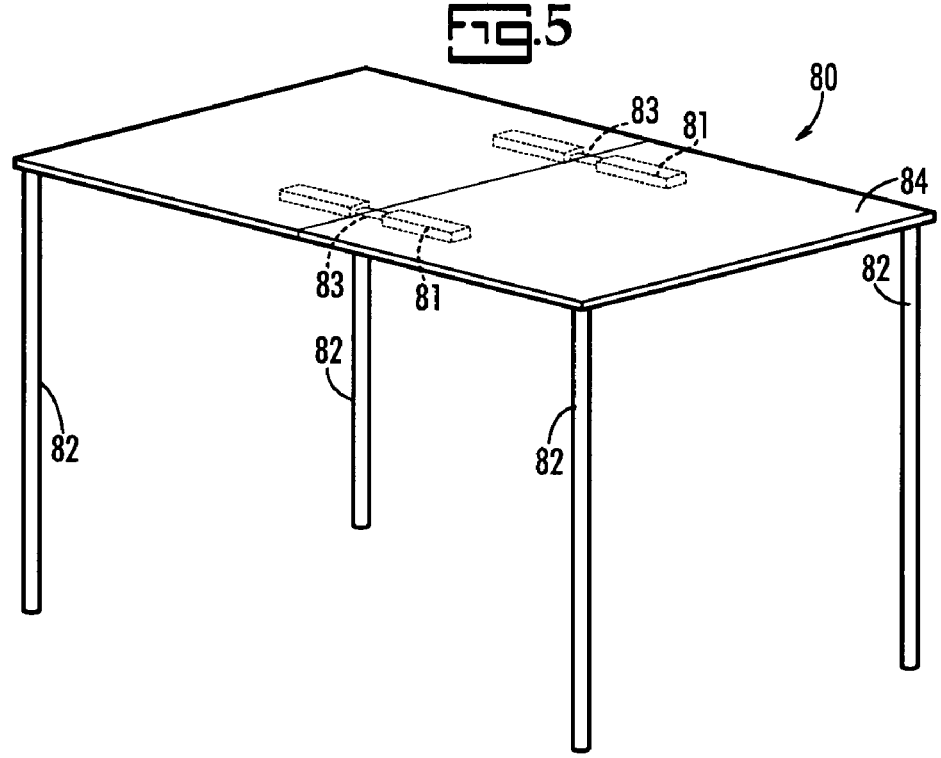
FIG. 5 is a perspective view of an unfolded side panel in accordance with the present invention.

FIG. 5 is a perspective view of an unfolded side panel, shown generally at 80, in accordance with the present invention. When the convertible container 20 is disassembled, at least one of the side panels 30, 40 may be unfolded to provide a table or work surface 81. The unfolded side panel 80 includes at least one retracting or folding support 82 and a locking bar 31 that secures the side panel 80 in an unfolded and substantially planar configuration. The support 82 is preferably attached to the interior surface 84 of the side panel 80 to minimize interference with the table or work surface when the side panel is unfolded. Four retracting supports 82 are preferably attached to each side panel such that each retracting support 82 is positioned substantially adjacent one of the corners of the side panel.

A variety of conventional table or work surface supports that are retractable or foldable, including folding legs and telescoping legs, are known and may be used as the support 82 The support locks in an extended position for stable placement of the unfolded side panel on a surface and unlocks for retracting the support, but the particular type of support is not critical to the present invention. In one embodiment, the side panel 80 includes a recess 86 formed on the interior surface 84 thereof to cradle the support 82 in a retracted position. When the support 82 is folded or retracted, the support 82 is positioned in the recess 86 so as to minimize interference with any contents of the container 20.

As previously mentioned, the side panel 80 includes a locking bar 31 such as a locking bridge or slide latch, that is attached to the interior surface 84 of the side panel 80. In one embodiment, the locking device 31 includes a guide 81 that is mounted on the interior surface 84 of each of the portions of the side panel 80 and receives the slide latch 83 therein. As best shown in FIG. 5, the guide 81 is aligned such that the slide latch 83 is positioned to connect the guide on one portion of the side panel 80 with the aligned guide on the other portion of the side panel 80 thereby securing the side panel in an open, unfolded, and substantially planar configuration. In another embodiment, a channel may be formed on the interior surface 84 of the side panel 80 in place of the aforementioned guide to allow positioning of the slide latch therein. The particular locking mechanism used to secure the side panel 80 in the open configuration is not critical to the container 20, and a variety of conventional locking devices may be used to prevent folding or pivoting of one portion of the side panel 80 with respect to the other portion while maintaining the side panel in an unfolded and substantially planar configuration. To provide the table or work surface 81, the side panel is unfolded and secured using the locking bar 31, and the support 82 is extended or unfolded to allow the unfolded side panel 80 to stand on a surface.

As previously mentioned, when the container is in the assembled configuration, the side panels 30, 40 and end panels 50, 60 are secured to one another using quick-release pins 86 that are inserted through aligned holes formed through the panels 30, 40, 50, 60. Aligned holes are formed through the tracks of each end panel and the coupling ends of the side panels. For example, aligned holes are formed through the tracks 54, 64 of the end panels 50, 60 and through the coupling ends 36, 38, of the back panel 32, the coupling ends 46, 48 of the bottom panel 42, and the coupling ends 47, 49 of the front panel 44. Each coupling end of a side panel is inserted into the coupling track of the corresponding end panel, aligned, and secured to the end panel by inserting a quick-release pin through the aligned hole. Because quick-release pins are easily insertable and removable, quick-release pins are preferably used to secure the side panels 30, 40 and end panels 50, 60 to one another thereby allowing the container 20 to be simply assembled and disassembled.

The release pins may be secured to the interior surface of the end panels 50, 60 by a tether such as a cord or wire. Securing the release pins to the end panels 50, 60 allows for simple retrieval of the release pins during assembly of the container 20 while preventing loss of the release pins during disassembly of the container 20. Although quick-release pins are used to secure the side panels to the end panels, other retaining mechanisms may be used to secure the side panels to the end panels while readily allowing detachment of the side panels from the end panels during disassembly of the container 20. Alternative retaining mechanisms include, but are not limited to, a resiliently flexible catch, a releasable detent, and a shackled lock.

Figures 6A, 6B:
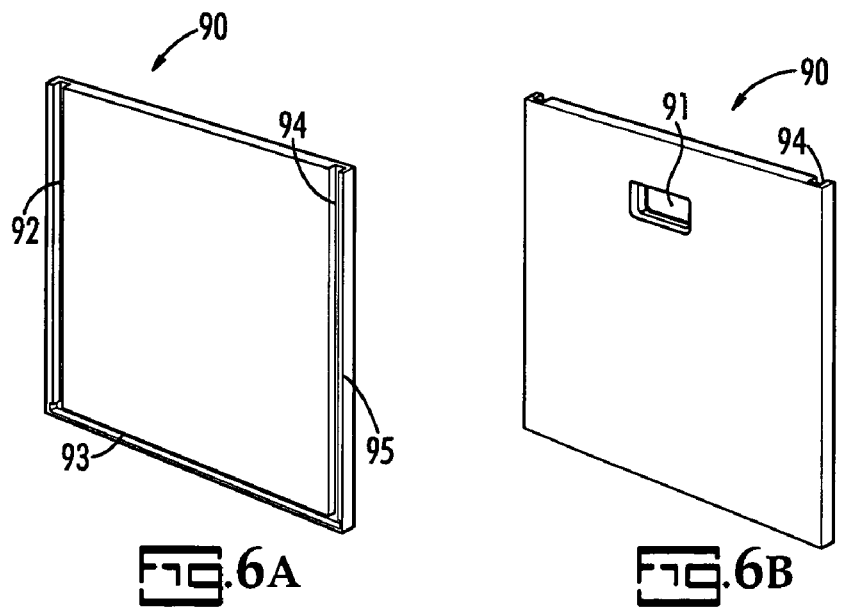
FIG. 6A is a bottom view of an end panel in accordance with the present invention.
FIG. 6B is a top view of the end panel shown in FIG. 6A in accordance with the present invention.

FIG. 6A is a bottom view of an end panel 90 in accordance with the present invention. FIG. 6B is a top view of the end panel 90 shown in FIG. 6A in accordance with the present invention. As previously mentioned, handles 51, 61, 91 are attached to the end panels 50, 60, 90 for transporting the container 20. The handles 51, 61, 91 are preferably recessed to prevent unwanted interference with the environment. As best shown in FIG. 6A, the coupling tracks 54, 64, 94 are adapted to receive the coupling ends of the back panel 32, bottom panel 42, and front panel 44, such as by tight fit. The coupling track 54, 64, 94 of one end panel 50, 60, 90 includes three segments 92, 93, 95 that are each adapted to receive a coupling end of one of the back panel 32, bottom panel 42, and front panel 44. For example, the coupling track 94 includes a back segment 92 that receives one coupling end 36 of the back panel 32, a front segment 95 that receives one coupling end 47 of the front panel 44, and a bottom segment 93 that receives one coupling end 46 of the bottom panel 42. When the container 20 is assembled, the top panel 34 is not received by a coupling track so as to pivot with respect to the back panel 32 to open and close the container 20. A gasket or seal may be attached to the top panel 34 to further prevent the undesired elements of the environment, such as rain, from entering the container 20.

Figure 7:
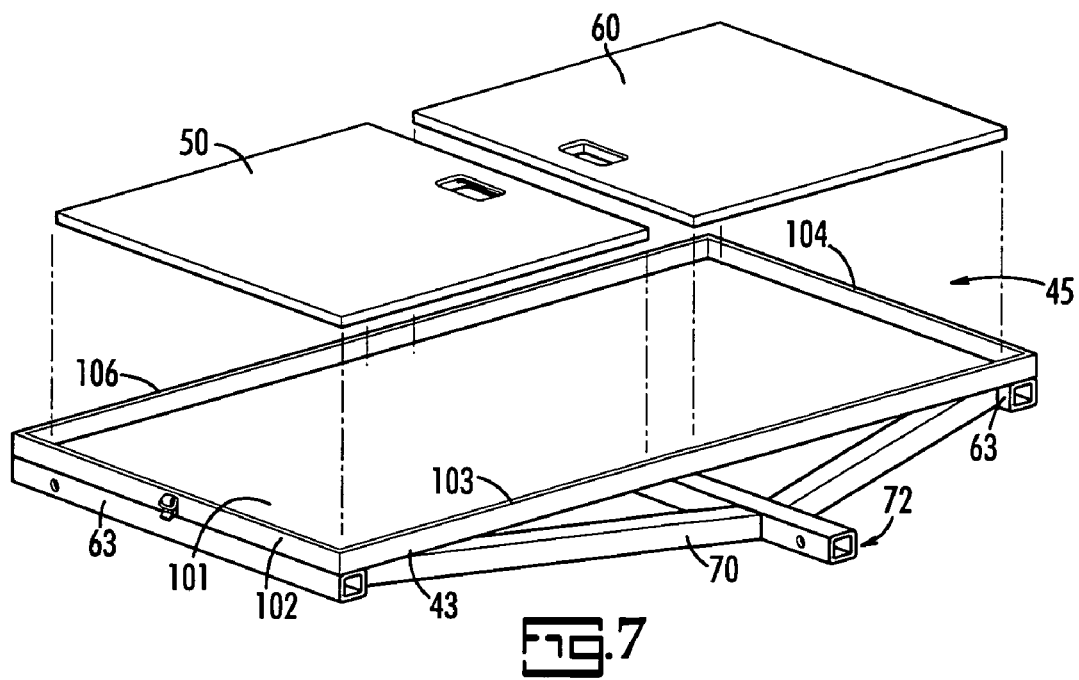
FIG. 7 is a perspective view of a carrier receiving end panels of the container in accordance with one embodiment of the present invention.

FIG. 7 is a perspective view of a carrier 45 receiving end panels 50, 60 of the container 20 in accordance with one embodiment of the present invention. The horizontal disposed platform 43 has a horizontally disposed rectangular shaped bottom panel 101 with vertical side walls 102, 103, 104, 106 extending upwardly from the four edges of its bottom least as high as the thickness of the side panels 50, 60. The end panels 50, 60 are sized to fit side by side within a perimeter of the platform 43 formed by the walls 102, 103, 104, 106 such that the end panels 50, 60 rest on the platform 43 adjacent to each other to form a surface. When the carrier 45 is attached to a vehicle by attaching the mating member 72 to the vehicles hitch, the surface formed by the end panels 50, 60 resting within and on the platform 43 of the carrier 45 may be used as a work surface or seating area because it is supported by attachment to the vehicle.

Figure 8:
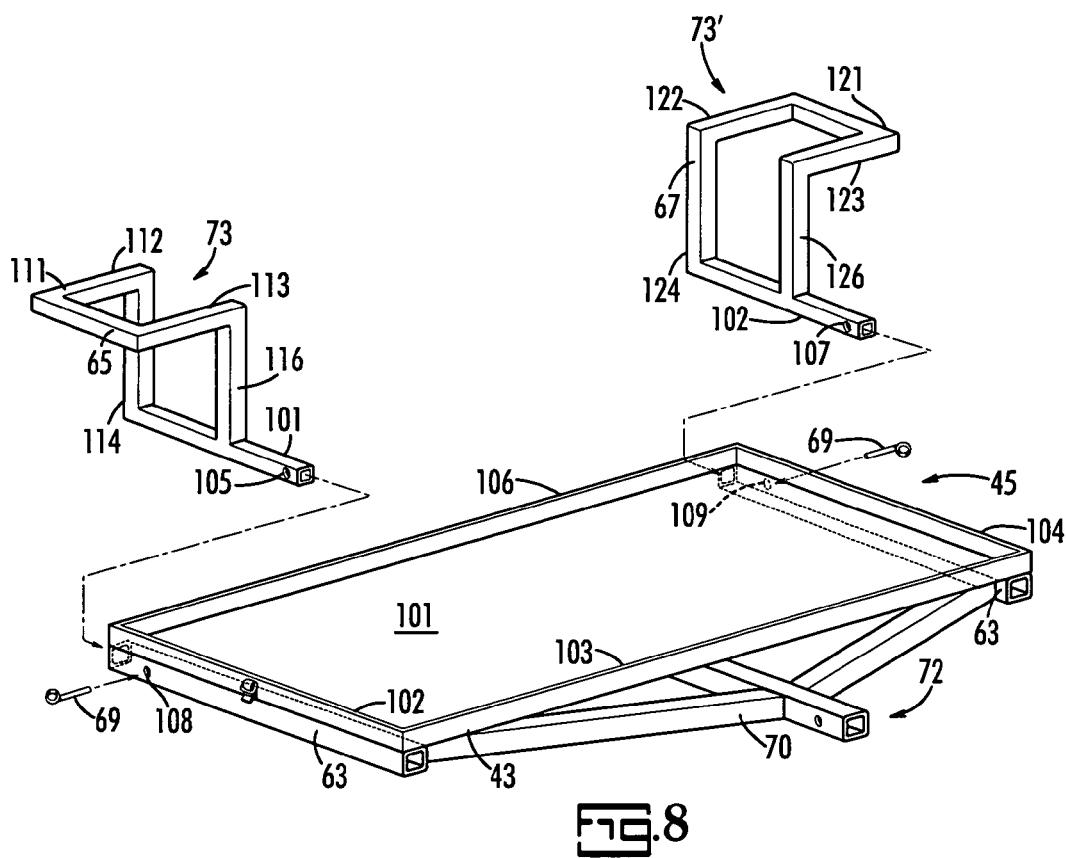
FIG. 8 is a perspective view of a carrier receiving an accessory rack in accordance with one embodiment of the present invention.

FIG. 8 is a perspective view of a carrier 45 receiving laterally spaced accessory rack 73, 73' in accordance with one embodiment of the present invention. In this embodiment, the carrier 45 includes square section laterally spaced rigid tubes 63, 63' (FIGS. 7 and 8) that are attached beneath and to laterally opposite ends, respectively of the platform 43. The rigid hollow tubes 63, 63' are part of the hitch adapter 70. The accessory racks 73, 73' include mounting units 65, 67, respectively, that couple, respectively, with the parallel mounting tubes 63, 63' attached to laterally opposite ends of the platform 43. The mounting units 65, 67 have rigid square section tube arms 101, 102 that slide into and couple with the square section tubes 63. In otherwords, the tube arms 101, 102 of the mounting units 65, 67 are sized to slidably fit in the parallel front to rear extending horizontal hollow tubes 63, 63'. To secure the mounting units 65, 67 to the tubes 63, 63' quick-release pins 69 may be inserted into holes 106, 107 formed through the mounting arms 101, 102 and the holes 108, 109 in the tubes 63 63'. The rack 73 includes a horizontally disposed U-shaped bracket 111 with parallel arms 112, 113 extending laterally inward with their laterally inward ends rigidly connected to the upper ends of a pair of parallel vertical legs 114, 116 which in turn have their lower ends rigidly connected to the fore and aft extending tube arm 101. The rack 73' is reverse image of rack 73 and includes a U-shaped bracket 121 with the laterally inner ends of its parallel horizontal arms 122, 123 rigidly secured to upper ends of vertical legs 124, 126, whose lower ends are rigidly secured to the arm 102 of the rack 73'. The U-shaped brackets 111, 121 extend laterally outward beyond the laterally width of the carrier 45 and its platform 43 thereby providing a support for transportable items resting on the arms 101, 102 and nesting within the U-shaped brackets 111, 121. In other words the racks serve to carry items that are wider than the platform 43.

As best shown in FIG. 8, the width extending between one mounting unit 65 and the other mounting unit 67 of the accessory rack exceeds the width of the platform 43. The accessory rack 73 ideally provides additionally storage space for items that exceed the dimensions of the container 20, such as easy-up canopies or roll-up awnings.

Those of ordinary skill in the art will be aware of other variations that are within the scope of the claimed invention, which is to be measured by the following claims.

What is claimed is:

1. A convertible cargo container system comprising:
   a top panel;
   a back panel hingeably connected to said top panel, said back panel having a pair of opposing coupling ends;
   a front panel having a pair of opposing coupling ends;
   a bottom panel hingeably connected to said front panel, said bottom panel having a pair of opposing coupling ends;
   a first end panel having a coupling portion adapted to receive a first end of said pair of coupling ends of said back panel, a first end of said pair of opposing coupling ends of said front panel, and a first end of said pair of coupling ends of said bottom panel;
   a second end panel having a coupling portion adapted to receive a second end of said pair of coupling ends of said back panel, a second end of said pair of opposing coupling ends of said front panel, and a second end of said pair of coupling ends of said bottom panel; and
   said end panels being connectible to said back, bottom and front panels to form said cargo container with said hinged top panel providing access to said container, and
   a plurality of support legs retractably attached to interior surfaces of said top, back, front, and bottom panels, respectively, said support legs in their retracted condition being disposed within said cargo container formed by said panels,
   said top and back panels and their retractable support legs being adjustable to form a first table and said front and bottom panels and their retractable support legs being adjustable to form a second table.

2. A convertible cargo container system according to claim 1 further comprising a lock mounted to said front panel.

3. A convertible cargo container system according to claim 1 further comprising:
   a first locking hinge interconnecting said top panel with said back panel; and
   a second locking hinge interconnecting said front panel with said bottom panel;
   wherein said first locking hinge coupling locks said top panel with said back panel; and
   wherein said second locking hinge coplanarly locks said front panel with said bottom panel.

4. A convertible cargo container system according to claim 1 further comprising a vehicle mountable carrier detachably attached to said bottom panel.

5. A convertible cargo container system according to claim 4, wherein said vehicle mountable carrier is a detachable hitch mateable with a vehicle hitch.

6. A convertible cargo container system according to claim 1, wherein each of said coupling portion of said first end panel and each of said coupling portion of said second end panel comprises a track.

7. A convertible cargo container system according to claim 6 further comprising at least one securing means interconnecting one of said coupling portion of said first end panel and said coupling portion of said second end panel to one of one of said pair of coupling ends of said front panel, one of said pair of coupling ends of said back panel, and one of said pair of coupling ends of said bottom panel.

8. The convertible cargo container system of claim 1 and further comprising:
   a carrier having a front end and including
      a container platform adapted to receive and releasably secure to said bottom panel and a hitch coupling portion on said front end adapted for connection to a vehicle trailer hitch.

9. The convertible cargo container system of claim 8 wherein said container platform has a bottom and vertical side walls extending upwardly from the edges of said bottom at least as high as the thickness of said end panels, said end panels being sized to fit side by side within said side walls and fill said container platform to form a horizontal support surface.

10. The convertible cargo container system of claim 8 wherein said carrier includes a pair of parallel fore and aft extending hollow tubes secured to laterally opposite sides, respectively, of said carrier and further comprising a pair of laterally spaced accessory racks, each having a fore and aft extending rigid tube arm, said tube arms being adapted to be telescopically fitted in and releasably secured to said hollow tubes, respectively, a horizontally disposed U-shaped bracket with a pair of parallel arms extending laterally inward and a pair of vertically disposed legs having upper ends rigidly connected to the laterally inner ends of said arms, respectively, and having lower ends rigidly connected to the tube arm of the associated rack.

\* \* \* \* \*